July 5, 1960
D. L. HOLDEN
2,944,013
PRODUCING METAL-FREE PETROLEUM STOCKS BY HYDROGENATION
Filed Dec. 9, 1957
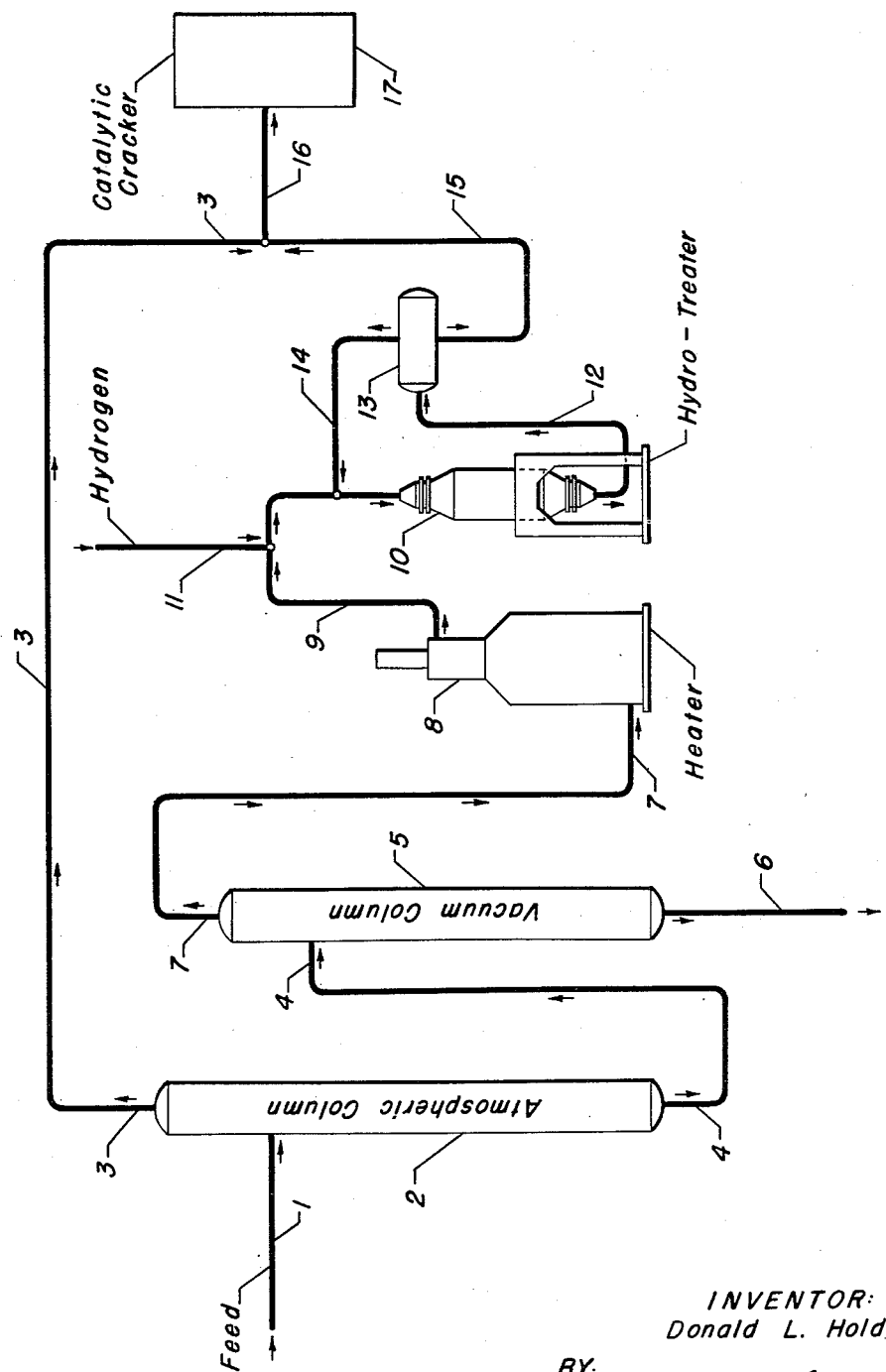
INVENTOR:
Donald L. Holden
BY:
Chester J. Giuliani
Glen R. Grunewald
ATTORNEYS.

2,944,013

PRODUCING METAL-FREE PETROLEUM STOCKS BY HYDROGENATION

Donald L. Holden, Des Plaines, Ill., assignor, by mesne assignments, to Universal Oil Products Company, Des Plaines, Ill., a corporation of Delaware Filed Dec. 9, 1957, Ser. No. 701,607

3 Claims. (Cl. 208—251)

This invention relates to a process for producing metal-free petroleum fractions and especially for producing feed stocks for catalytic cracking processes.

Crude petroleum contains small quantities of metal contaminants including nickel, vanadium, molybdenum, tungsten, iron, etc. and these metals may occur in many forms. The metal contaminants may be in the form of metal oxides or sulfides and may be found in crude oil as it comes from the well or it may be introduced into the crude as scale or other particles from metallic equipment used in fluid handling. The metals may be in the form of soluble salts that are dissolved in the aqueous contaminants of the crude or they may be in the form of organo-metallic compounds such as porphyrins.

When a metal-contaminated stock is employed as a charge to a catalytic cracking process the metals contained in the charge deposit upon the cracking catalyst. The cracking catalyst composition which is closely controlled to give it special characteristics is changed by the deposit of metal contaminants on the catalyst and the changed composition results in changed catalyst characteristics. Even a small amount of metal will have a disproportionately large effect on a cracking catalyst and this effect is undesirable because the metals tend to increase the dehydrogenation activity of the catalyst and to destroy its selectivity. The result is that a metal contaminated catalyst will produce a product containing less liquid product, more normally gaseous hydrocarbons, more hydrogen, more coke and a more unsaturated product which will be less stable in storage and less suitable as a motor fuel.

Some metal contaminants, such as oxides or sulfides which are in the solid state, may be removed from a petroleum fraction simply by filtering the fraction. Water-soluble metal salts may be removed by washing and dehydrating the fraction and some of the organo-metallic compounds may be removed by clay treating or suitable distillation techniques wherein the boiling range in which the organo-metallic material occurs is separated from the rest of the charge and discarded. Any one of these techniques or all three of them combined, however, cannot do a complete job of removing metal from heavier fractions since some of the organo-metallic compounds boil in most of the higher boiling ranges. It is an object of this invention to provide a combination process which will produce a metal-free higher boiling petroleum fraction suitable as charge stock for a catalytic cracking process.

In one embodiment, this invention provides a process for producing a metal-free hydrocarbon distillate from a petroleum charge which comprises fractionating said petroleum charge to obtain a metal-free overhead fraction and a bottoms fraction, fractionating said bottoms fraction to obtain a metal-contaminated residue and an overhead fraction containing metal compounds removable by hydrotreating, commingling the latter fraction with hydrogen and passing it into a hydrotreating zone maintained at a temperature of from about 350° C. to about 500° C. and at a pressure in excess of 200 p.s.i., said zone containing a catalyst comprising a porous carrier impregnated with a metal having a hydrogenating activity and recovering a second metal-free fraction from said hydrotreating zone.

The basis of this invention is the discovery that organo-metallic compounds occur in two categories; namely those that are removable by hydrotreating and those that are not. It is also based on the discovery that the metal contaminants not removable by hydrotreating occur in higher boiling portions of the petroleum crude while the lower boiling portions of the petroleum crude contain no volatile organo-metallic compounds. The accompanying drawing illustrates one embodiment of this invention and is presented to better illustrate the process without intending to unduly limit the invention to the specific materials or process flow shown. In the drawing a feed stock which may be a total crude or any selected fraction thereof is introduced through line 1 into an intermediate portion of column 2. The feed in line 1 will be treated by filtration, dewatering, etc. so that it contains only oil-soluble metal compounds. Column 2, although shown as an atmospheric column may operate under superatmospheric pressure or at a slight vacuum depending upon the boiling range of the overhead material. The fraction taken overhead from column 2 through line 3 is selected to boil in the range that is free of volatile organo-metallic compounds. The overhead fraction from column 2 accordingly is suitable for a catalytic cracking feed stock as such with regard to its metal content, however, it may require further fractionation. For example, if the charge to column 1 was a total crude then the stream passing through line 3 would contain gasoline, kerosene, etc., which materials should be removed prior to catalytic cracking.

The material passing from the lower portion of column 2 through line 4 is a higher boiling fraction which contains all of the metal contaminants from the original charge. This material is passed into vacuum column 5 wherein an overhead fraction is separated from a residue. The residue passed from the lower portion of column 5 through line 6 contains the highest boiling portions of the charge to column 2 and in addition contains all of the metal contaminants which are not removable by hydrotreating. Line 7 from the top of column 5 contains the intermediate boiling portion of the crude and only metal contaminants that are removable by hydrotreating. This material is heated in furnace 8 and passed through line 9 where it is commingled with hydrogen from lines 11 and 14 and the resultant mixture is passed into hydrotreater 10.

In hydrotreater 10 hydrogenation reactions are effected which decompose the organo-metallic compounds to the corresponding metal-free hydrocarbon and cause the metal contaminant to deposit upon the porous hydrogenation catalyst in the reaction zone. This catalyst may be any hydrogenation catalyst such as metals from group VI, VII or VIII deposited on a porous refractory support such as silica, alumina, zirconia, titania, etc. or any combinations of these with each other or with small amounts of acid-acting substances such as halogens, phosphates, etc. An effluent from the hydrotreating zone passes through line 12 into receiver 13 wherein a liquid separates from a vapor. The vapor will consist largely of hydrogen and may be at least partly returned to the reaction zone through line 14. The liquid portion of the effluent passes through line 15 and may be recovered as a metal-free fraction or, as shown, it may be mixed with the material in line 3 and passed through line 16 to a catalytic cracking process represented by block 17.

As a specific example of the best mode of operating the process of this invention, the following experiment is reported. A topped crude was introduced into an atmospheric column and fractionated so that the overhead material had a 370° C. end point. The bottoms from the atmospheric column containing 62 p.p.m. vanadium and 18 p.p.m. nickel were introduced into a vacuum column which was operated at 5 millimeters or less total pressure and a top temperature of 370° C. The heavy residue passing through line 6 may be burned as fuel, discarded or subjected to thermal treatments, however, the overhead material passing through line 7 is introduced into a treating reactor at a temperature of 400° C., a pressure of 55 atmospheres of hydrogen and at a liquid hourly space velocity of 10 volumes of charge per volume of catalyst per hour. The hydrotreating zone contained a catalyst comprising alumina upon which 2.2% cobalt and 5.7% moybdenum by weight were deposited. The effluent from hydrotreating zone 10 was a substantially metal-free feed stock boiling in the same range as the charge to the hydrotreater. The liquid product from the hydrotreater was not only found to be metal-free, but it was improved by having lower sulfur concentration, lower nitrogen concentration, lower oxygen concentration, and a slight amount of hydrocracking from the process resulted in lighter colored, more fluid material. The effluent from hydrotreater 10 may be introduced directly into a catalytic cracking process and may be employed as a feed for long periods of time without catalyst contamination.

As a general rule, the organo-metallic compounds in all but the heaviest portion of the crude are removable by hydrotreating and deep vacuum distilling, for example, discarding only material boiling above 450° C. at 0.05 millimeter of total pressure, will produce an overhead fraction that is capable of being purified by hydrotreating. Also, as a general rule, material boiling below 370° C. at atmospheric pressure will be substantially free of organo-metallic impurities. The nature of the impurities and their exact boiling ranges, however, will vary somewhat between crudes from various sources and some analysis may be necessary to accurately determine the cut points for the fractionators.

On a typical Mid-Continent crude, it was found that at a 325° C. top temperature and 4.6 millimeters total pressure, 0.1 part per million of nickel was in the overhead fraction. Below this quantity a serious contamination problem does not exist and accordingly material boiling lower than this may be charged to a catalytic cracking process without treatment for removal of organo-metallic contaminants.

The process of this invention, by combining a sequence of fractionations with a hydrotreating zone in a specific manner provides a feed stock for a catalytic cracking process which is completely free of metal contaminants. This is furthermore accomplished by discarding only a very small residual fraction which is not well suited as a charge to a catalytic cracking process even if not contaminated.

I claim as my invention:

1. A process for producing a metal-free hydrocarbon distillate from a petroleum charge which comprises fractionating said petroleum charge to obtain a lower boiling metal-free fraction and a bottoms fraction, fractionating said bottoms fraction to obtain a higher boiling metal-containing residue and an overhead fraction boiling in the range of from about 370° C. to about 450° C. and containing metal compounds removable by hydrotreating, commingling said overhead fraction with hydrogen and subjecting it to hydrotreating at a temperature of from about 350° C. to about 500° C. and a pressure in excess of 200 p.s.i. in the presence of a catalyst comprising a porous refractory carrier and a metal having hydrogenation catalyst activity and recovering a second metal-free fraction resulting from said hydrotreating.

2. A process for producing a metal-free hydrocarbon distillate from a petroleum charge which comprises fractionating said petroleum charge to obtain an overhead fraction having an end point lower than 450° C. and a bottoms fraction, fractionating said bottoms fraction at above 0.05 millimeter total pressure and a temperature lower than 450° C. to obtain a high boiling metal-contaminated residue and an overhead fraction containing metal compounds removable by hydrotreating, commingling said overhead fraction with hydrogen and subjecting it to hydrotreating at a temperature of about 350 to about 500° C. and at least 200 p.s.i. in the presence of a catalyst comprising a porous refractory base and a metal having hydrogenating catalyst activity and recovering a second metal-free fraction resulting from said hydrogenation.

3. The process of claim 1 further characterized in that said catalyst comprises molybdenum deposited upon alumina.

References Cited in the file of this patent

UNITED STATES PATENTS

| 2,682,496 | Richardson et al. | Jun. 29, 1954 |
| 2,764,525 | Porter et al. | Sept. 25, 1956 |
| 2,846,358 | Bieber et al. | Aug. 5, 1958 |